United States Patent [19]
Fioravanti

[11] 3,823,977
[45] July 16, 1974

[54] MOTOR VEHICLE BODYWORK WITH RIGID SUNSHINE ROOF

[75] Inventor: Leonardo Fioravanti, Moncalieri (Turin), Italy

[73] Assignee: Carrozzeria Peninfarina S.p.A., Turbin, Italy

[22] Filed: Oct. 30, 1972

[21] Appl. No.: 301,924

[30] Foreign Application Priority Data
Nov. 3, 1971  Italy.................................. 70604/71

[52] U.S. Cl. ............................ 296/137 B, 296/107
[51] Int. Cl............................................... B60j 7/16
[58] Field of Search............ 296/107, 137 R, 137 B, 296/123

[56] References Cited
UNITED STATES PATENTS
2,785,922  3/1957  Chika................................. 296/107
3,347,592  10/1967  Renneker........................... 296/107
3,357,738  12/1967  Bourlier.......................... 296/137 R FOREIGN PATENTS OR APPLICATIONS
704,468  4/1968  Italy................................ 296/137 R

*Primary Examiner*—Leo Friaglia
*Assistant Examiner*—Randall A. Schrecengost
*Attorney, Agent, or Firm*—Sughrue, Rothwell, Mion, Zinn & Macpeak

[57] ABSTRACT

A vehicle bodywork is provided with a rigid sunshine roof panel which, in accordance with this invention, extends almost the entire length of the roof and is connected to a rear cross member of the fixed roof structure by two pivoted rocker arms which can slide and rotate in longitudinal guides on each side of the roof panel, permitting the latter when released to be accommodated on the rear trunk lid of the vehicle, while allowing normal opening of said lid.

2 Claims, 4 Drawing Figures

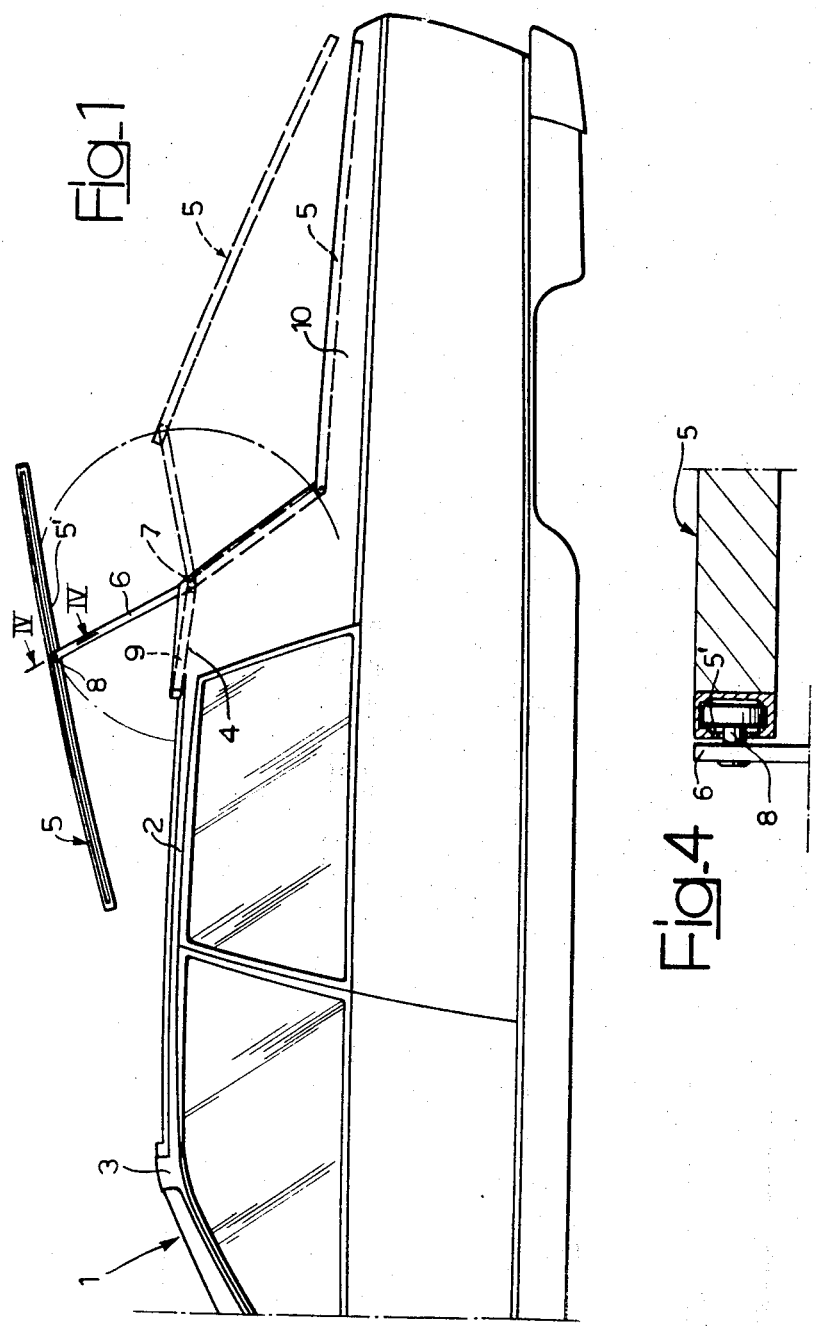

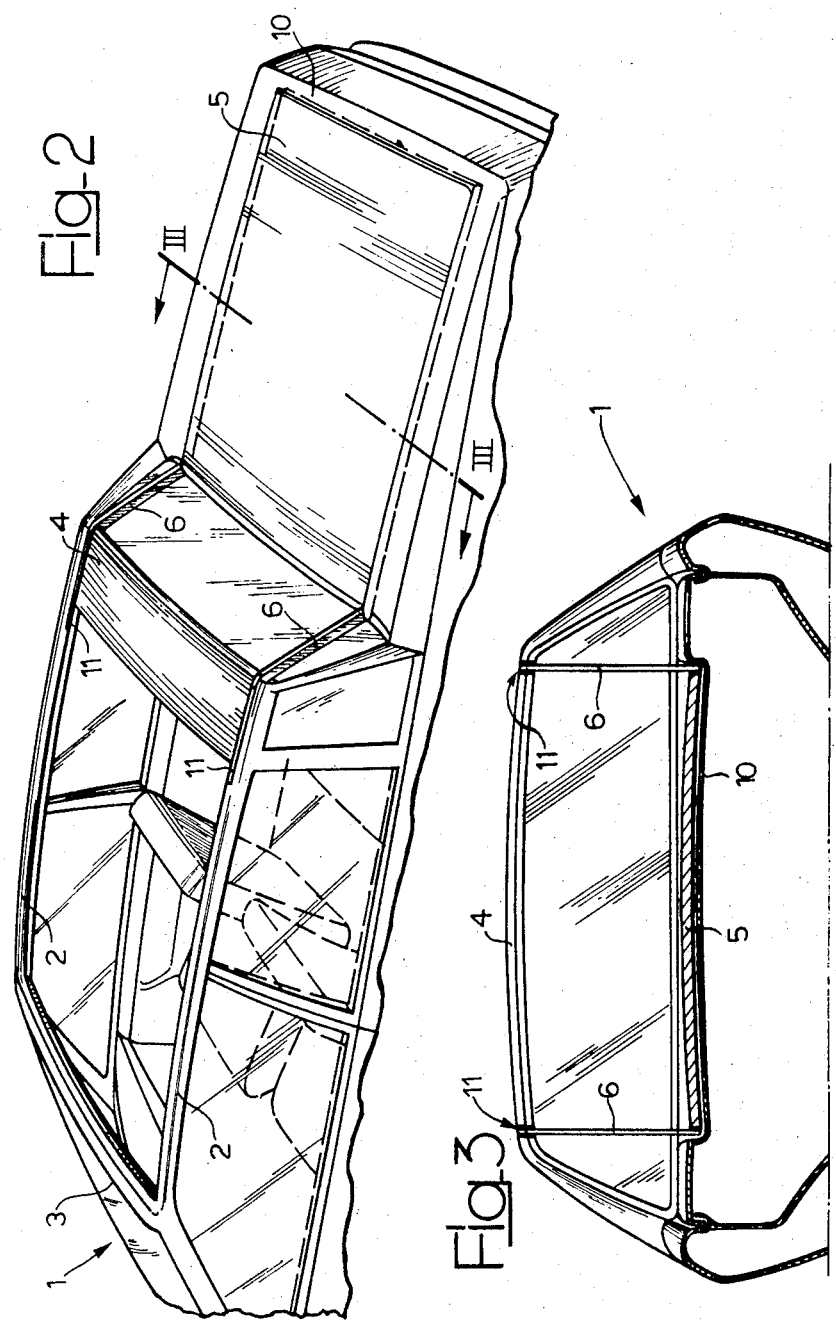

MOTOR VEHICLE BODYWORK WITH RIGID SUNSHINE ROOF

This invention relates to a vehicle body provided with a sunshine roof.

BACKGROUND OF THE INVENTION

It is known to provide the bodywork of a motor vehicle with a rigid roof with a rigid portion which can be opened: opening can be effected either by making the openable portion of the roof capable of sliding relative to the fixed remainder of the roof, or by providing a rigid roof panel which can be removed from the fixed remainder of the roof that is, the front and rear frame cross-members and main frame members of the roof, and which can be stowed on the inside or the outside of the rear trunk of the vehicle.

This second arrangement is used principally for automobiles of the sports type, in which the length of the roof is limited in relation to the total length of the bodywork, as compared with vehicles of the saloon type in which the sliding or removable portion of the roof takes up only a small percentage of the overall roof length, generally less than 50 percent.

An object of this invention is the provision of a vehicle bodywork in which almost the whole of the roof may be easily removed to uncover the passenger compartment entirely.

Another object of the invention is to provide a vehicle bodywork in which opening and removal of the sunshine roof is simple and can be achieved by convenient and easy manoeuvres.

SUMMARY OF THE INVENTION

According to the invention there is provided a bodywork for a motor vehicle of the type with a rigid sunshine roof, characterised in that the roof of the passenger compartment is closed by a movable rigid roof panel which extends over almost the whole length of the roof and is connected to the fixed part of the bodywork in correspondence with a rear cross member of the latter above the rear window, by means of a pair of rocker arms each of which is articulated at one end to the said rear cross member and is engaged at its free end slidingly and rotatably in longitudinal guides in the roof panel so that, in the fully open position of the roof panel, the said panel can be located on a rear trunk lid of the vehicle while allowing normal opening of the said trunk lid.

BRIEF DESCRIPTION OF THE DRAWINGS

The invention will be further described, by way of non-limiting example, with reference to the attached drawings, in which:

FIG. 1 is a diagrammatic partial side elevation of a motor vehicle bodywork according to one embodiment of this invention;

FIG. 2 is a diagrammatic partial perspective view of the bodywork;

FIG. 3 is a diagrammatic cross section, taken on line III—III of FIG. 2, and

FIG. 4 is a diagrammatic partial cross section, on an enlarged scale, taken on line IV—IV of FIG. 1.

DETAILED DESCRIPTION OF THE ILLUSTRATED EMBODIMENT

Referring to the drawings, the bodywork of an automobile is shown generally at 1, being in this example a saloon body of the convertible type, with four positions.

The roof of the bodywork consists of a movable rigid panel 5 which fits in a space defined between two longitudinal frame side members 2, a front cross member 3 above the windscreen, and a solid rear cross member 4 above the rear window, these rigid frame members forming a safety structure in the event of overturning of the vehicle.

The roof panel 5 extends over almost the whole length of the roof and therefore opens up the passenger compartment entirely when it is removed from its normal housing in the roof frame.

The roof panel 5 is connected to the two sides of the bodywork 1 by means of a pair of rocker arms 6, which are articulated at one end at fulcra 7 situated at the rear cross member 4 of the bodywork, and which carry at their free ends two cross pins 8 with enlarged heads (FIG. 4). The pins 8 are free to slide and to rotate in longitudinal guides 5' carried at the sides of the movable roof panel 5.

When the roof panel 5 is removed from its normal closed position in the roof frame it is moved rearwardly on the arms 6 so as to be able to rest upon the lid 10 of the rear trunk, such movement being guided by the rotation of the connecting arms 6 and the free sliding of the cross pins 8 in the longitudinal guides 5' of the roof panel.

In the completely open position, in which the roof panel 5 rests upon the lid 10 of the rear trunk, normal opening and closing of the said lid 10 is possible.

In the said open position, the roof panel 5 is conveniently housed in a recessed area of trunk lid 10, whilst the rocker arms rest on or close to the rear window close to the lateral supports of the rear cross member 4 (FIGS. 2 and 3). The cross member 4 has, laterally, two longitudinal slots 11 in which the two rocker arms 6 are located in the closed position of the roof panel 5.

In order to facilitate opening of the roof panel 5 a small torsion bar 9 is housed, in the rear member 4 of the roof. When the roof panel 5 is initially released from its closed position the torsion bar 9 partially raises the rear portion of the panel 5, at least to a certain extent, in order to facilitate the gripping of the roof panel 5 and movement of the panel.

The movements of the roof panel 5 in both directions can be carried out manually, or mechanical motor means may be provided for effecting the movements automatically.

The bodywork will obviously be fitted with locking means (not shown) which engages the roof panel 5, either in the closed position of the panel when it rests on the roof frame or in the open position of the roof panel in which it is attached to the trunk lid 10.

It will be appreciated that details of practical embodiments of the invention may be widely varied in relation to the embodiment described and illustrated, without nevertheless going beyond the scope of this invention.

What is claimed is:

1. Bodywork for a motor vehicle of the type having a rigid sunshine roof, comprising:

a fixed bodywork part having a rear cross member above the rear window of the vehicle body, a movable rigid roof panel which extends over almost the whole length of the roof to a position abutting the leading edge of said rear cross member, a pair of rocker arms connected to the fixed part of the bodywork in correspondence with said rear cross member, each said rocker arm being articulated at one end to one end of the said rear cross member, and longitudinal guides in said roof panel in which the free ends of said rocker arms engage slidingly and rotatably, said panel being adapted, in the fully open position of the roof panel, to be located on a rear trunk lid of the vehicle, while allowing normal opening of the said trunk lid.

2. Vehicle bodywork as claimed in claim 1, wherein said rear cross member is provided with two longitudinal recesses which accommodate, in the closed position of the roof panel, said rocker arms which connect the roof panel to said rear cross member.

* * * * *